United States Patent [19]

Asmus

[11] Patent Number: 4,870,932
[45] Date of Patent: Oct. 3, 1989

[54] FUEL INJECTION HEATING SYSTEM

[75] Inventor: Thomas W. Asmus, Oak Park, Mich.

[73] Assignee: Chrysler Motors Corporation, Highland Park, Mich.

[21] Appl. No.: 274,079

[22] Filed: Nov. 21, 1988

[51] Int. Cl.⁴ .............................................. F02M 31/12
[52] U.S. Cl. ............................ 123/179 H; 123/179 L; 123/549
[58] Field of Search ................... 123/179 L, 472, 557, 123/179 H, 549; 239/13, 135

[56] References Cited

U.S. PATENT DOCUMENTS

| | | |
|---|---|---|
| 1,223,124 | 4/1917 | Thompson . |
| 3,601,110 | 8/1971 | Kamazuka ...................... 123/179 L |
| 3,648,669 | 3/1972 | Rank . |
| 3,683,871 | 8/1972 | Barr et al. ........................ 123/179 L |
| 3,731,876 | 5/1973 | Showalter ............................ 239/13 |
| 3,762,378 | 10/1973 | Bitonti ................................ 123/557 |
| 3,868,939 | 3/1975 | Friese et al. . |
| 3,999,525 | 12/1976 | Stumpp et al. . |
| 4,197,996 | 4/1980 | Giardini .............................. 123/472 |
| 4,375,799 | 3/1983 | Swanson . |
| 4,378,001 | 3/1983 | Takeda . |

Primary Examiner—Willis R. Wolfe
Assistant Examiner—M. Macy
Attorney, Agent, or Firm—Kenneth H. MacLean, Jr.

[57] ABSTRACT

An injector heating apparatus and system for a vehicle engine having fuel injectors with a solenoid coil in a housing for passing fuel into the engine, including an electrical control unit to alternately produce a normal engine run mode and an injector heating mode. A temperature sensing switch signals the electrical control so that in the injector heating mode the fuel pump and engine starter are deenergized and the injector coils are energized for a timed period so that the injectors can be heated and subsequently the temperature of fuel passed therethrough is increased by heat transfer therefrom during a subsequent start and run mode of operation.

5 Claims, 1 Drawing Sheet

FUEL INJECTION HEATING SYSTEM

BACKGROUND OF THE INVENTION

It is difficult to start an internal combustion engine with a fuel such as methanol which has very low vapor pressure characteristics at low temperatures. An impractical but common method to start and warm-up an engine using such a fuel at these low temperatures is to provide a second fuel just for starting and warming the engine. This second fuel has a higher vapor pressure characteristic. Such a dual fuel system is used experimentally and requires separate fuel tanks and fuel lines as well as a control to direct the use of the two fuels. That makes this solution unacceptable for general use. This is a reason that methanol based fuels have generally not been well received as a serious alternative for automobiles and trucks.

A partial solution to the low vapor pressure problem is the practice of blending fuels to raise its low temperature vapor pressure. An example of such a blend is a 15% gasoline-85% methanal fuel known as M85.

There are a number of earlier patents disclosing systems and apparatus to heat fuel prior to engine use at low temperatures. The U.S. Pat. Nos. 3,868,939 and 3,999,525 disclose apparatus to heat fuel prior to injection into the engine by means of a housing with a resistance heater.

The U.S. Pat. Nos. 1,223,124 and 3,648,669 disclose a device with a resistance heater located downstream from the outlet of a fuel discharge device.

U.S. Pat. No. 4,375,799 discloses a carburetor in which a fuel inlet is encircled by a resistance heater.

U.S. Pat. No. 4,378,001 discloses a throttle body in which an injector is mounted so as to spray fuel towards a heater located opposite to the injector outlet.

SUMMARY OF THE INVENTION

From the above discussion of the background, it is apparent that the basic concept of heating fuel of an internal combustion engine is old. The present fuel preparation system is an improvement over the previously described system. It is particularly useful in starting an engine on a fuel such as methanol which is characterized by a very low vapor pressure at low temperatures. The subject system is directed to an internal combustion engine using electrically activated fuel injectors disposed near the intake port of each cylinder. This type of injector has a valve opened by a solenoid coil to control fuel flow through the outlet to the combustion chamber. The solenoid coil is typically mounted within a metal housing through which the fuel flows.

The present system energizes the solenoid coil of the injector for a period of time prior to starting the vehicle engine. This heats the mass of the injector. At the same time, since this opens the fuel injector, it is necessary that the engine's electric fuel pump be deactivated. Also, operation of the starter motor should be prevented. Temperature sensing means must activate the injector heating mode when the temperature is low but must allow normal starting when the temperature is higher.

The present injector heating system has other advantageous features and objects which will be clearly understood after a reading of the following detailed description of an embodiment, reference being made to the following drawings of the specific embodiment.

IN THE DRAWINGS

FIG. 1 is a schematical view of the fuel heating system and a partial view of related engine portions; and FIG. 2 is a sectioned elevational view of the fuel injector shown in FIG. 1; and FIG. 3 is a typical plot of voltage normally applied to the fuel injector coil during an engine operating mode; and FIG. 4 is a plot of voltage applied to the injector coil during an injector heating mode at low temperatures prior to starting the engine.

DESCRIPTION OF A PREFERRED EMBODIMENT

Figure 1:
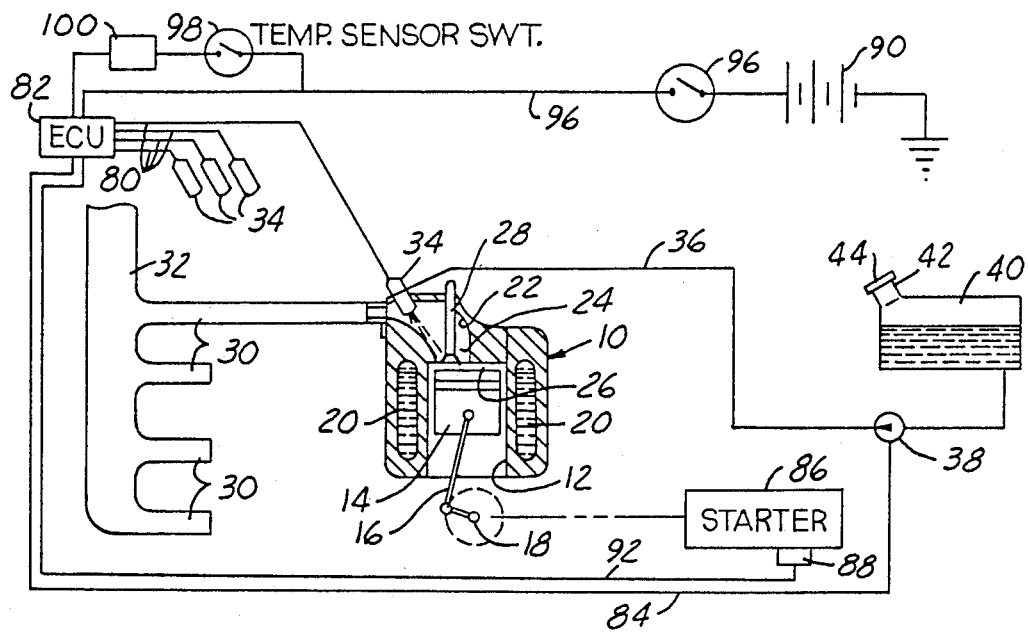

Part of an internal combustion engine 10 is illustrated in FIG. 1. The engine 10 defines a cylinder 12 in which a piston 14 is reciprocated. The piston 14 is operatively attached to a connecting rod 16 which in turn is attached to a throw of a crankshaft 18. To cool the engine, coolant filled passages 20 encircle the cylinder 12. Air is passed into the engine 10 through an intake passage 22 and an inlet port 24. The air enters the engine's combustion chamber 26 past a poppet type valve 28 which regulates the introduction of the air. Air is supplied to an intake passage 22 of each combustion chamber by air inlet tubes 30 which are connected commonly to an inlet log 32.

Fuel is sprayed into the intake passages 22 by fuel injectors 34 where it mixes with the air. The fuel is supplied to the injectors 34 by supply lines 36. The supply lines 36 receive fuel from an electric fuel pump 38 which is connected to the vehicle fuel tank 40. Tank 40 has inlet or filler tube 42 normally covered by cap 44.

Figure 2:
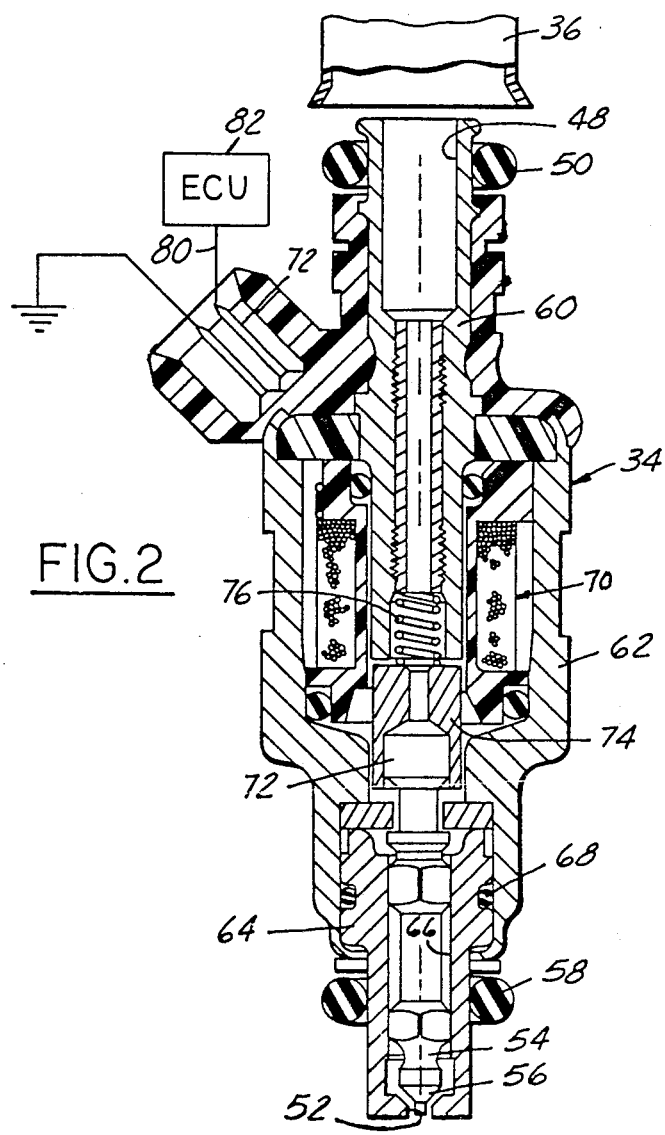

Details of a typical fuel injector 34 is shown in FIG. 2. The fuel injector 34 has an elongated enclosure or housing with an open upper end defining a fuel inlet passage 48. This upper end is adapted to engaged a portion 36 of the fuel supply line in a sealed manner. An O-ring 50 engages the supply line to prevent leakage of fuel. A small orifice or outlet passage 52 is formed in an opposite lower end from the inlet end 48. A valve member 54 is supported for reciprocation in the housing and includes a conically shaped end portion 56. The end portion 56 engages the outlet end portion of the housing to normally block fuel flow through the housing. An O-ring 58 around the outlet end engages the engine structure which forms the intake passage 22 to prevent vacuum leakage therebetween.

Specifically, the structure of injector 34 includes a metal upper portion 60 forming the fuel inlet, a metal mid-portion 62 and a metal outlet forming housing portion 64. Housing portions 60, 62, and 64 are axially aligned one to another and define a fuel flow path from one end to another. The lower portion 64 has a central bore 66 in which valve member 54 reciprocates. The lower end of mid-portion 62 is folded over portion 64 to connect the two and an O-ring seal 68 therebetween seals the two. An elastomeric portion connects the upper and mid-portion.

A tubularly shaped coil assembly 70 consisting of many wraps of wire is supported within the mid-portion 62. An enlarged solenoid plunger portion 74 is attached on the upper end portion 72 of the valve member 56. Portion 74 is partially located within the tubular coil assembly 70. A light spring 76 extends between the lower end of the housing 60 and portion 74. It urges the valve 54 downward against the lower end of the portion 64 to a closed position. In FIG. 2, the valve 56 is illustrated in its upward or opened position generated when the solenoid coil 70 is energized.

Figure 3:
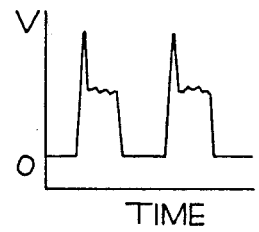

The solenoid coil 70 is energized by an application of voltage through a terminal 72 which extends through the elastomeric portion. A conductor 80 connects the terminal 72 with an outlet of ECU 82 (electrical control unit). During a normal engine operating mode, the ECU 82 applies voltage briefly to the solenoid coil 70 for a short period as illustrated in FIG. 3. This coil energizing takes place when the inlet valve 28 opens every other revolution as is conventional in a four cycle engine. During this normal engine operating mode, the ECU 82 energizes the fuel pump 38 through conductor 84. Resultantly, fuel is sprayed from the injector into inlet passage 22.

Referring again to FIG. 1, a starter motor 86 is illustrated and is operably connected to the crankshaft 18 as is conventional in automobiles. The motor 86 has a conventional starter solenoid switch assembly 88 which electrically connects motor 86 directly to the vehicle battery 90. The solenoid coil of switch assembly 88 is connected by wire 92 to the ECU 82. When it is desired to start the engine, the ignition switch 94 is closed and ECU 82 is activated through wire 96. ECU 82 energizes starter switch 88 through wire 92. Also, the ECU 82 energizes the fuel pump 38 and the ignition circuit and components (not shown).

Figure 4:
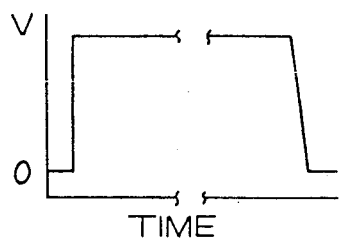

An injector heating mode of operation is initiated whenever the engine temperature is below a predetermined low temperature for a given fuel. For any given fuel, this temperature is determined as the highest temperature of the fuel which has insufficient vapor pressure to support engine starting and cold running. The injector heating mode of operation is directed by the ECU 82. The temperature conditions for initiating this heating mode is sensed by a temperature sensing and switching device 98. The device 98 is connected to a timer device 100. When the timer 100 is activated, ECU 82 initiates the injector heating mode. In the injector heating mode, the fuel pump 38 is deactivated and the starter switch assembly 88 is prevented from being energized. Note that the coils of the injector 34 are energized by the maximum battery voltage as shown in FIG. 4. Of course, this coil energizing opens the injectors. Since the fuel pump 38 is deactivated, no fuel sprays into the inlet passage 22 of the engine.

The timer 100 limits the period of time which the injector coil is energized. It is only necessary to energize the coil so that the injector housing achieves a desired temperature. After a period of time as further explained hereinafter, timer 100 terminates the injector heat signal to ECU 82 and it returns to the normal engine start and run mode. In this mode, the fuel pump 38 and starter 86 are activated and the injector coils are energized as in FIG. 3 in accord with engine needs for fuel delivery. By then, the injector housing is elevated to a sufficient temperature to act as a heat source to incoming cold fuel. Resultantly, the fuel's vapor pressure and consequentially the fuel partial pressure is increased sufficiently to promote a rapid first fire in the combustion chambers and a successful engine start and run-up before the injectors loose their stored heat to the fuel and surroundings.

The following is an example of how the subject injector heating system applies to an engine set up to operate on methanol. This fuel exhibits an insufficient vapor pressure at a temperature of about 25 degrees F. The injector illustrated in FIG. 2 is a Bosch MPI (multi point type injector) and is commercially available. The injector weighs about 0.22 pounds and the impedance of its coil is 1.8 ohms. Calculations support an average specific Cp (heat constant) per mass of about 0.1 BTU/lb-degree F. A maximum time delay of 23 seconds (20 seconds of heating plus 3 seconds to pressurize the fuel rails and injectors) has been judged to be reasonably acceptable to a vehicle operator. Using a 12 volt battery and this Bosch injector, the calculated energy per injector is about 80 watts. This equals a heat change of about 0.44 watt-hours/injector or 1.53 BTU. Since Temperature Change=Heat Change/Cp(mass) or 1.53 /0.1(0.22), the injector's temperature change is equal to 69.6 degrees F. assuming no heat loss to surroundings.

Although the above detailed description of a preferred embodiment of the subject injector heating apparatus and system is directed to only the one embodiment shown in the drawings, the invention is not necessarily limited to the specific embodiment, as the claims define the invention. It should be understood that the specific embodiment of the fuel heating apparatus and system is subject to modifications which would not fall outside the scope of the following claims which define the invention.

I claim:

1. A heating system and apparatus for a fuel injector of an internal combustion engine of a vehicle, comprising: a fuel injector including a hollow housing with a fuel inlet and a fuel outlet; an electric fuel pump for delivering fuel to the inlet of the injector; the fuel injector having a valve member therein cooperative with the outlet and movable from a closed position to an opened position for regulating fuel flow from the fuel pump, through the housing and from the injector; electric coils in the injector housing for moving the valve member to the opened position when energized; an electric control unit to energize the injector coil in accordance with fuel requirements of a running engine during a starting and running mode; a temperature sensing device which signals the electric control unit to initiate a timed injector heating mode when the engine temperature is below a predetermined low temperature characterized by an insufficient vapor pressure of the fuel, wherein the fuel pump is deactivated and the injector coils are continuously energized in the injector heating mode so that sufficient heat is stored in the injector for heating fuel in a subsequent engine starting and running operation.

2. A heating apparatus and system for a fuel injector of a vehicle internal combustion engine, comprising: means to inject fuel into the engine including a fuel enclosure with an electrical coil therein, the injection means having a valved outlet which is normally closed but selectively opened for delivery of fuel to the engine whenever fuel is pumped into the housing and the coil is energized; an electrically powered fuel pump to selectively deliver fuel to the injectors when energized; an electrical control unit for selectively energizing the injector coil and the fuel pump, the control unit having a timed injector heating mode in which the fuel pump is deactivated and the injector coil is continuously energized; temperature sensing means to signal the electric control to initiate the timed injector heating mode whereby the injector coil is energized and the fuel pump is deactivated resulting in significant heating of the coil and injector enclosure so that subsequent to the fuel heating mode, fuel passed through the injector by a reactivated fuel pump is heated sufficiently for successful mixture formation and thus burning in the combustion chamber.

3. The heating system and apparatus set forth in claim 2 in which an operator activated engine starting means is connected to the electric control and is deactivated when it is in the injector heating mode.

4. The heating system and apparatus set forth in claim 2 in which a timing means sets the time period for the injector heating operation of the electric control.

5. The heating system and apparatus set forth in claim 4 in which the timing apparatus is connected between the temperature sensing means and the electric control.

* * * * *